US007593354B2

(12) United States Patent
Surin et al.

(10) Patent No.: US 7,593,354 B2
(45) Date of Patent: Sep. 22, 2009

(54) METHOD AND SYSTEM FOR LOW LATENCY HIGH QUALITY MUSIC CONFERENCING

(75) Inventors: Nikolay Surin, Moscow (RU); Stanislav Vonog, Moscow (RU)

(73) Assignee: Musigy USA, Inc., San Francisco, CA (US)

( * ) Notice: Subject to any disclaimer, the term of this patent is extended or adjusted under 35 U.S.C. 154(b) by 67 days.

(21) Appl. No.: 11/717,606

(22) Filed: Mar. 13, 2007

(65) Prior Publication Data

US 2007/0223675 A1 Sep. 27, 2007

Related U.S. Application Data

(60) Provisional application No. 60/785,145, filed on Mar. 22, 2006.

(51) Int. Cl.
*H04M 3/56* (2006.01)
(52) U.S. Cl. .................... 370/260; 379/202.01; 370/266

(58) Field of Classification Search ......... 370/260–263, 370/266, 352–356; 379/202.01, 204.01, 379/205.01
See application file for complete search history.

(56) References Cited

U.S. PATENT DOCUMENTS

| 5,491,743 | A  | * | 2/1996 | Shiio et al. | ............. | 379/202.01 |
| 5,889,843 | A  | * | 3/1999 | Singer et al. | ........... | 379/202.01 |
| 6,697,342 | B1 | * | 2/2004 | Smyth et al. | ................. | 370/260 |
| 6,850,496 | B1 | * | 2/2005 | Knappe et al. | .............. | 370/260 |
| 7,197,126 | B2 | * | 3/2007 | Kanada | .................. | 379/202.01 |

* cited by examiner

*Primary Examiner*—Suhan Ni
(74) *Attorney, Agent, or Firm*—Perkins Coie LLP

(57) ABSTRACT

A method and system for real-time, low latency, high quality audio conferencing are disclosed. The system allows delivering low latency during peer to peer transmission of high quality compressed audio streams between remotely located participants. The system provides transmission of audio as well as any audio data with low latency and high quality. The system solves latency problems to enable participants in different locations to stay in synchronization while performing live over the Internet in multiple locations.

17 Claims, 15 Drawing Sheets

FEC SCHEMES

METHOD AND SYSTEM FOR LOW LATENCY HIGH QUALITY MUSIC CONFERENCING

CROSS REFERENCE TO RELATED APPLICATIONS

This application claims the benefit of prior filed co-pending U.S. Provisional Application Ser. No. 60/785,145, filed Mar. 22, 2006, entitled "Method And System For Low Latency High Quality Music Conferencing" by Surin et al., the contents of which are incorporated herein by reference.

FIELD OF INVENTION

The present invention relates generally to real-time, low latency, high quality audio conferencing allowing delivery of low latency during peer to peer transmission of high quality compressed audio streams between remotely located participants.

BACKGROUND

In an ever-increasing popularity of using the Internet, geographic, language, and economic boundaries are no longer meaningful. Creativity and collaboration in music and art over the Internet appear in great demand. Developing products and services for both amateur and professional musicians with an access to broadband is highly desirable. The core problems of enabling a music conferencing session over an IP network are network latency, jitter, and packet loss. These problems prevent musicians from achieving comfortable, high-quality, smooth, low latency simultaneous performance of all parties in a music conferencing session.

Redmann et al., in U.S. Pat. No. 6,653,545, disclose a method and apparatus for remote real time collaborative music performance. Redmann, however, uses MIDI sound control system which is not the most favored sound control system and high latency problems are unsolved. Redmann et al. disclose that the latency of the communication channel is transferred to a local station or musician, and suggest that each musician accommodate the latency by naturally adopting the latency locally. Redmann et al., however, does not disclose a method or system to reduce latencies for real time high quality digitized audio performance. Puryear, in U.S. Pat. No. 6,974,901, discloses kernel-mode audio processing modules. Puryear also discloses that avoiding transfers to user mode reduces latency and jitter in handling audio data such as MIDI data. Puryear, however, does not disclose a solution for real time high quality digitized audio streams. Weisman et al., in U.S. Pat. No. 6,839,417, disclose a method and apparatus for conference call management. Although some problems related to conference calling have been resolved by Weisman et al., problems specific to music conferencing remain unsolved. It is typical that voice conferencing shows high latency, low quality audio, and that the number of participants who can speak simultaneously is typically no more than two. U.S. Pat. No. 6,974,901 by et al. discloses Studies in psychoacoustics show that comfortable music performance is possible only in the case where the delay in sound between performances is no more than 50 milliseconds. Jitter poses another problem in music conferencing. Jitter is a variation in packet transit delay caused by queuing, contention and serialization effects on the path through the network. In general, higher levels of jitter are more likely to occur on either slow or heavily congested networks. Jitter leads to random variations of rhythm and adversely affects musicians in general.

Packet loss is another problem is IP network and it is generally known that packet loss distribution in IP networks is bursty, and that bursts are typically sparse rather than consecutive with length of several seconds during which packet loss may be 20 to 30%. Bursty packet loss has a severe impact on audio quality during a distributed musical performance. Although the average packet loss rate for music conferencing is low, the lost packets are likely to occur during short dense periods resulting in short periods of degraded quality. Therefore, there is a need for a system that improves sound quality. Furthermore, a demand for a system or software to keep latency level to the minimal values possible in live performance over the Internet is significantly increasing. The present invention provides a teaching that accomplishes the stated problem and in some embodiments, one or more of the problems have been reduced or eliminated.

SUMMARY

In various embodiments, one or more of the above-described problems have been reduced or eliminated.

The present invention relates to a method and system for audio conferencing between remotely located participants. Audio conferencing according to an embodiment can be used in a variety of applications. By way of example and not limitation, music conferencing enables musicians to join an online community, find other musicians with complementary skills and interests, perform live in a distributed environment, and share real-time performance with thousands of simultaneous audience. Advantageously, audio conferencing performed by the present invention solves latency problems and improves sound quality. Audio conferencing according to an embodiment enables musicians to stay in synchronization while performing from remote locations. Audio conferencing according to an embodiment is designed to function in broadband networks and virtual Internet concerts can be scaled to thousands of simultaneous audience.

The above-identified use of audio conferencing is just one non-limiting example. Audio conferencing according to an embodiment may be used in practically any types of conferencing applications that have parameters that are at least approximately met by one of various embodiments. Audio conferencing according to the present invention provides low latency, high quality audio exchange between multiple participants at the same time.

BRIEF DESCRIPTION OF THE DRAWINGS

Embodiments of the invention are illustrated in the figures. However, the embodiments and figures are illustrative rather than limiting; they provide examples of the invention.

In the figures, similar reference numerals may denote similar components.

DETAILED DESCRIPTION

Figure 1:
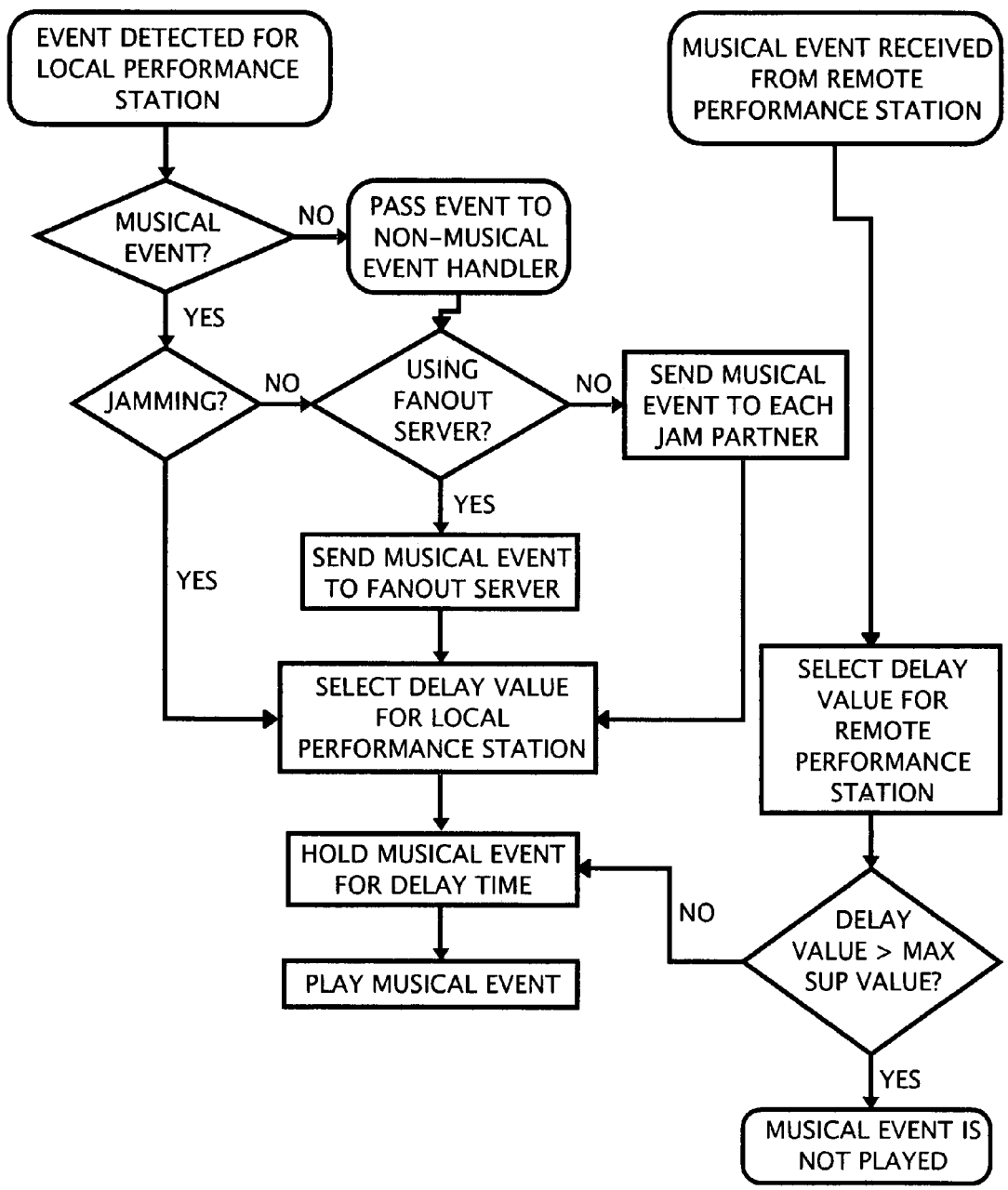
FIG. 1 is a prior art illustrating a flowchart for handling musical events.

FIG. 1 is a prior art illustrating a flowchart for handling musical events.

Figure 2:
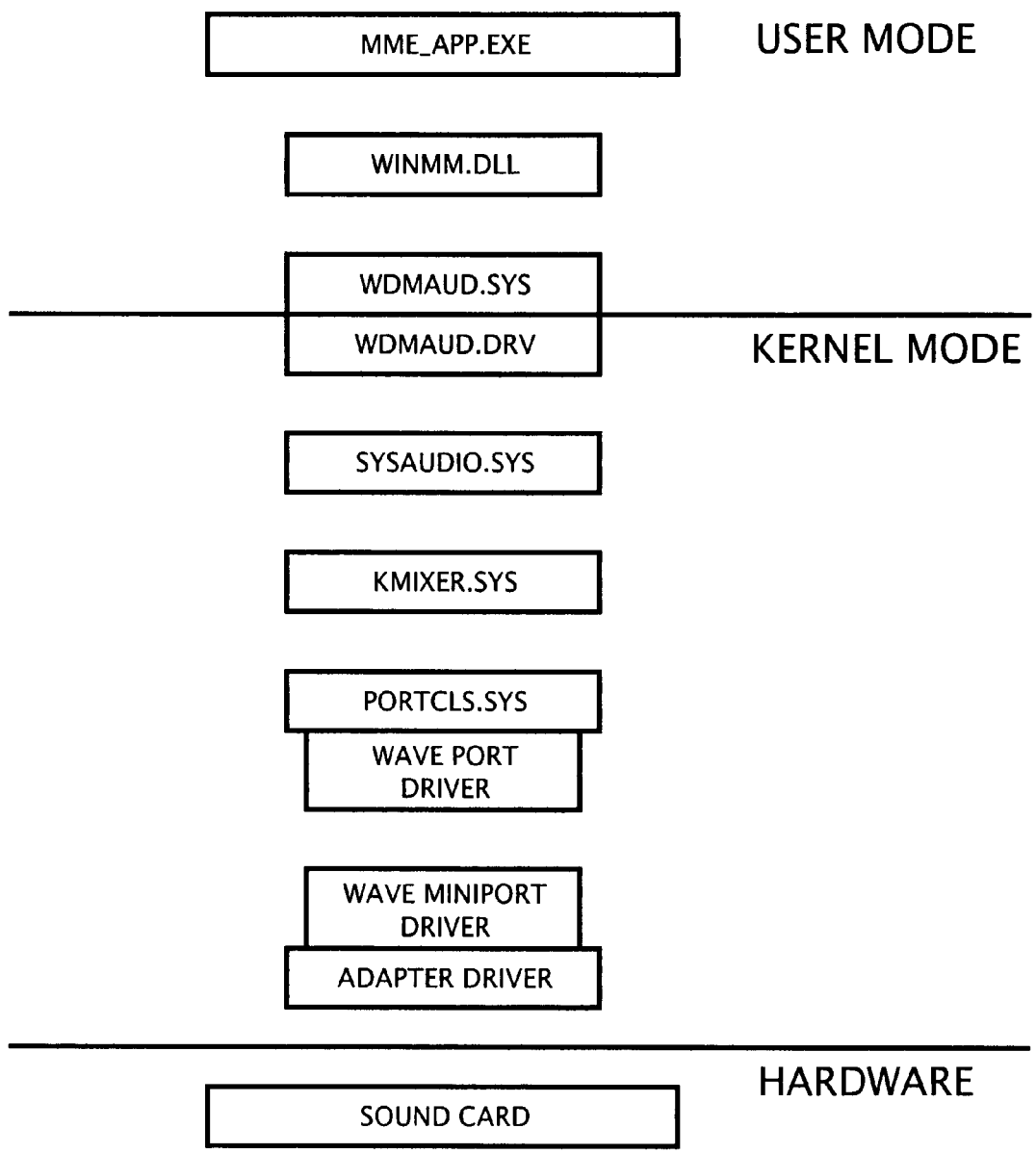
FIGS. 2 and 3 are prior art illustrating Windows standard MME Architecture and DirectSound Architecture, respectively.
Figure 3:
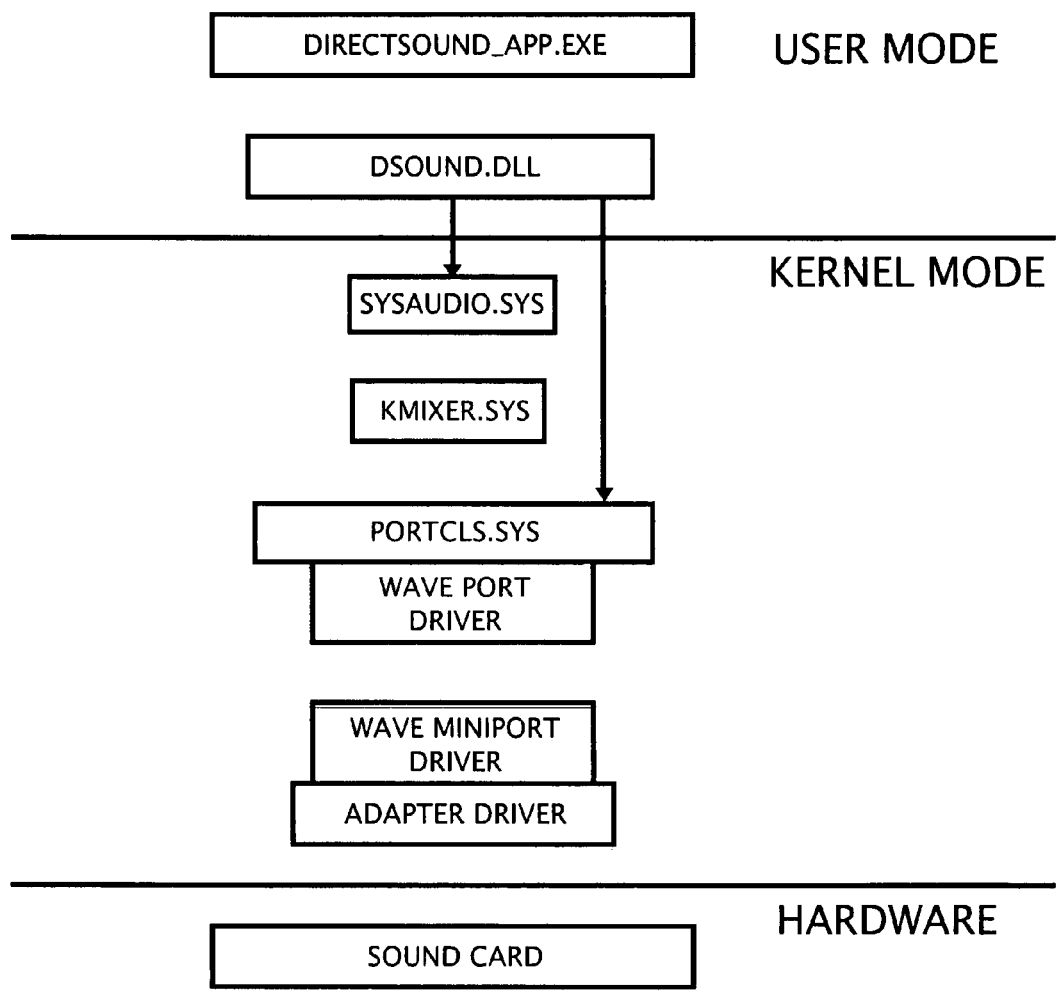

FIGS. 2 and 3 are prior art illustrating Windows standard MME Architecture and DirectSound Architecture, respectively.

Figure 4:
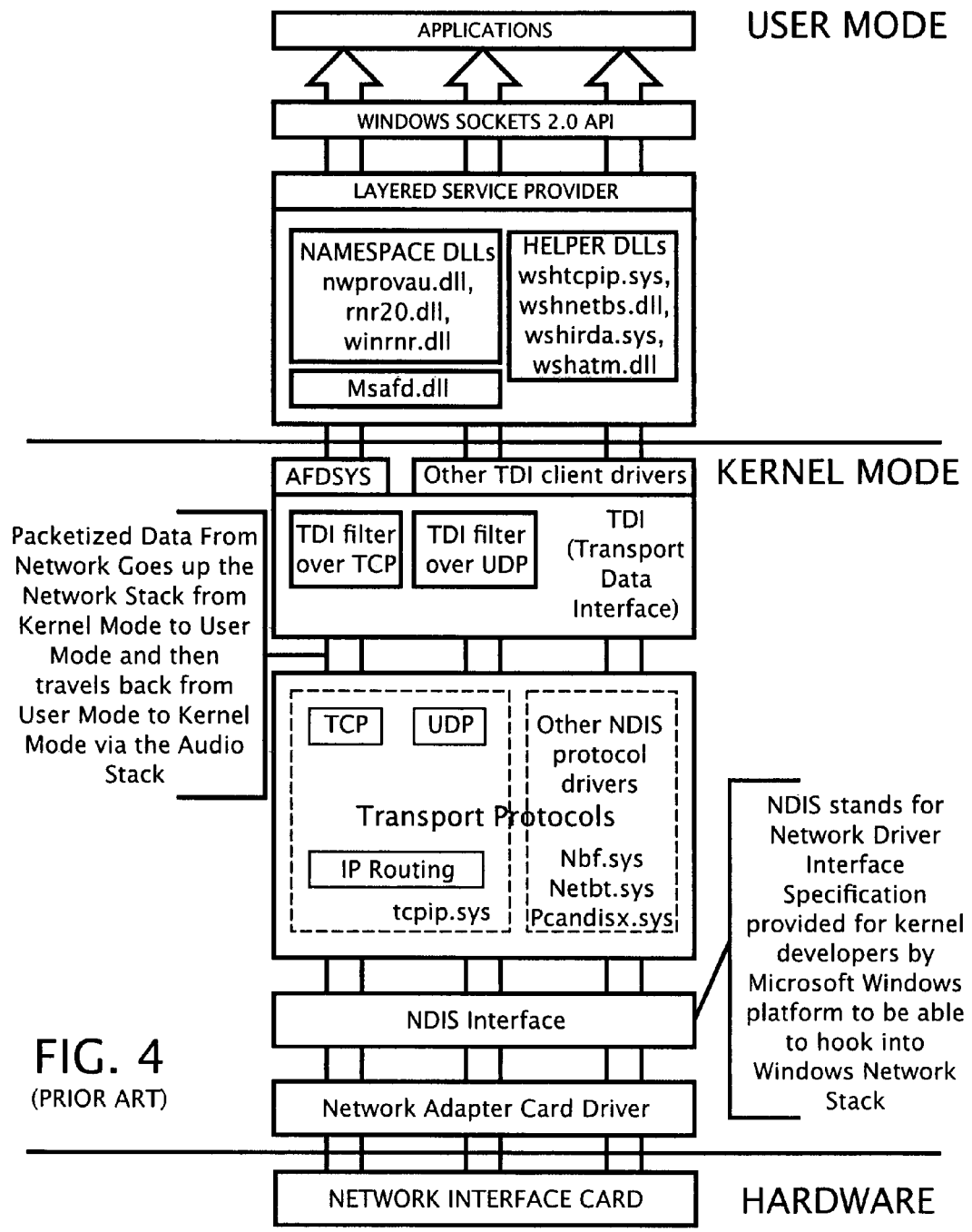
FIG. 4 is a prior art depicting Windows Network Stack.

FIG. 4 is a prior art depicting Windows Network Stack.

Figure 5:
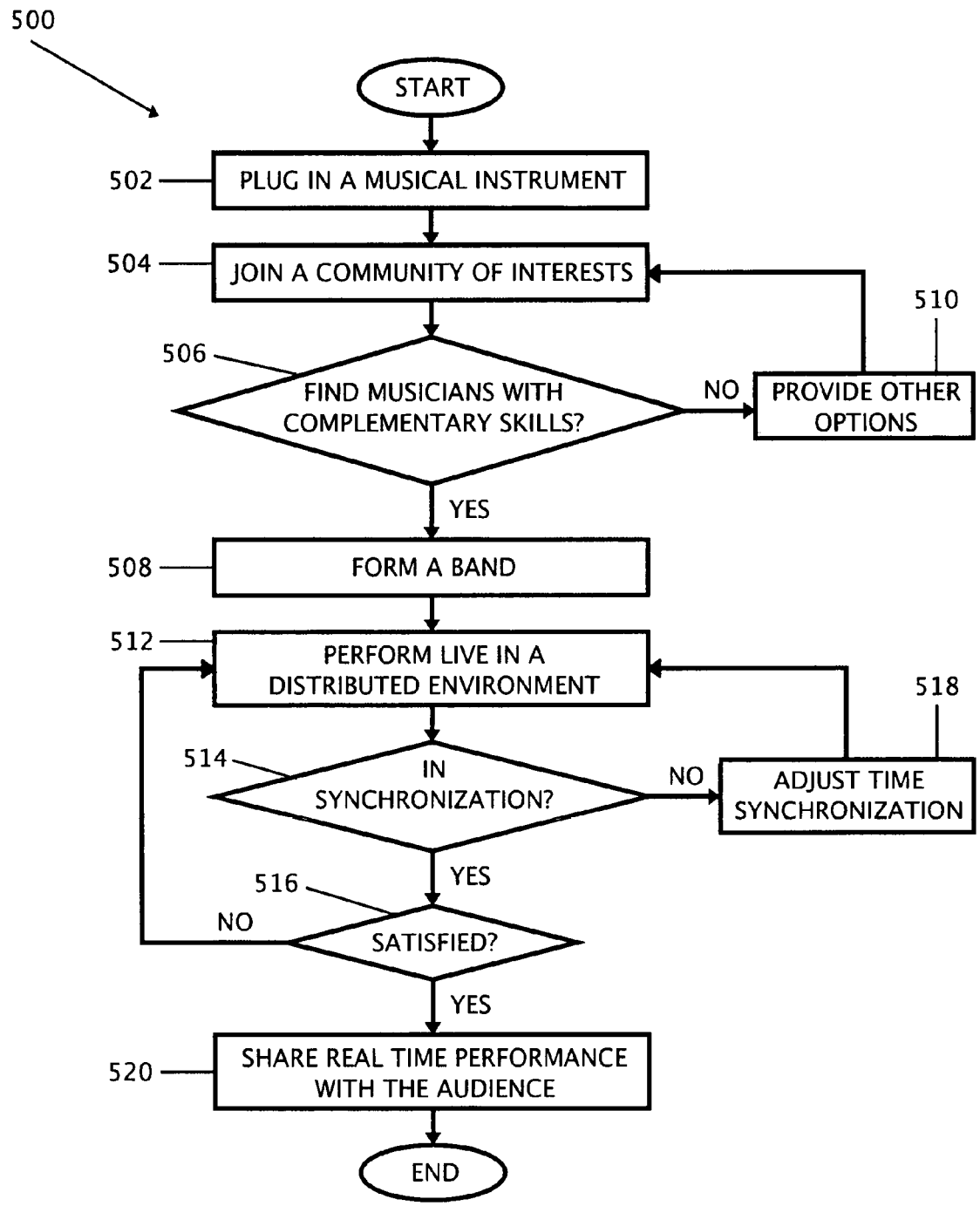
FIG. 5 is a flowchart for audio conferencing according to one embodiment of the invention.

FIG. 5 depicts a flowchart for audio conferencing 300 according to an exemplary embodiment.

In FIG. 5, by way of example and not limitation, a musician plugs a musical instrument into an electronic device 502. The electronic device 502 includes a computer or a mobile device. The participant creates a participant's profile and joins an online community 504. Participants in an online community 504 find other participants with complementary skills and interests 506. Once a participant finds participants with comparable skills and interests, they form a band for a live concert 508. If unsuccessful, participants go back to the online community 504 to find other participants. Alternatively, participants may provide other participants with other options such as prerecorded samples instead of performing a live concert over the Internet 510.

Once participants find others with complementary skills, they perform a live concert in a distributed environment 512. Participants stay in synchronization while performing from different locations 514. If in synchronization and every participant is satisfied with the performance 516, they share real-time performance with audience 520. If time synchronization is not acceptable, participants adjust the time synchronization to a mutually acceptable level 518. They perform a live concert again in multiple locations if not satisfied with their performance.

Low latency not more than 50 ms is maintained by employing the present invention. In addition, high quality audio over broadband limitations is achieved. In obtaining high quality audio, glitches and distortions are minimized. Multipoint audio/video conferencing with the audience are provided. The present invention employs standard video resources because video has lower requirements in delay. For instance, 80 ms in delay gets unnoticed by humans. Moreover, live performance can be recorded and replayed when necessary.

Live performance parameters include number of participants and geographical coverage. The collaborations or joint sessions among the participants can be demanding because of the difficulty in coordinating and managing substantial numbers of remotely located individual players in multiple locations. The present invention, therefore, would be most likely suited for small bands of up to four participants. It should be noted, however, that there are no inherent limitations on the number of performers. The number of participants could increase if more than one person congregates and plays in each of four locations depending upon the broadband bandwidths. Therefore, audio conferencing according to one embodiment accommodates four groups of participants to play together while maintaining the limit of four. It should be further noted that the term participant used herein simply means the user of the invention including, but not limited to, a skilled professional participant, an amateur musical artist, and/or a skilled or amateur singer. Compared to the limitations in the number of participants, there would virtually no limitations in the number of online spectators. The present invention provides on-demand streaming of recorded performances as requested. Retransmitting recorded performance with live artists playing simultaneously to multiple spectators such as for a live karaoke can be achieved by the invention.

Maximum geographical coverage that professional participants can afford would be 4,500 kilometers of raw distance, which is equivalent of latency of 15 ms. It should be noted that people could adapt to higher latency and perform across even longer distances. Furthermore, 15 ms latency is well tolerated by people in case where latencies over 100 ms could be noticed. Also note that vocalists in bands are less sensitive to latencies so that they could perform from much farther distance than other members of the bands, if necessary.

Figure 6:
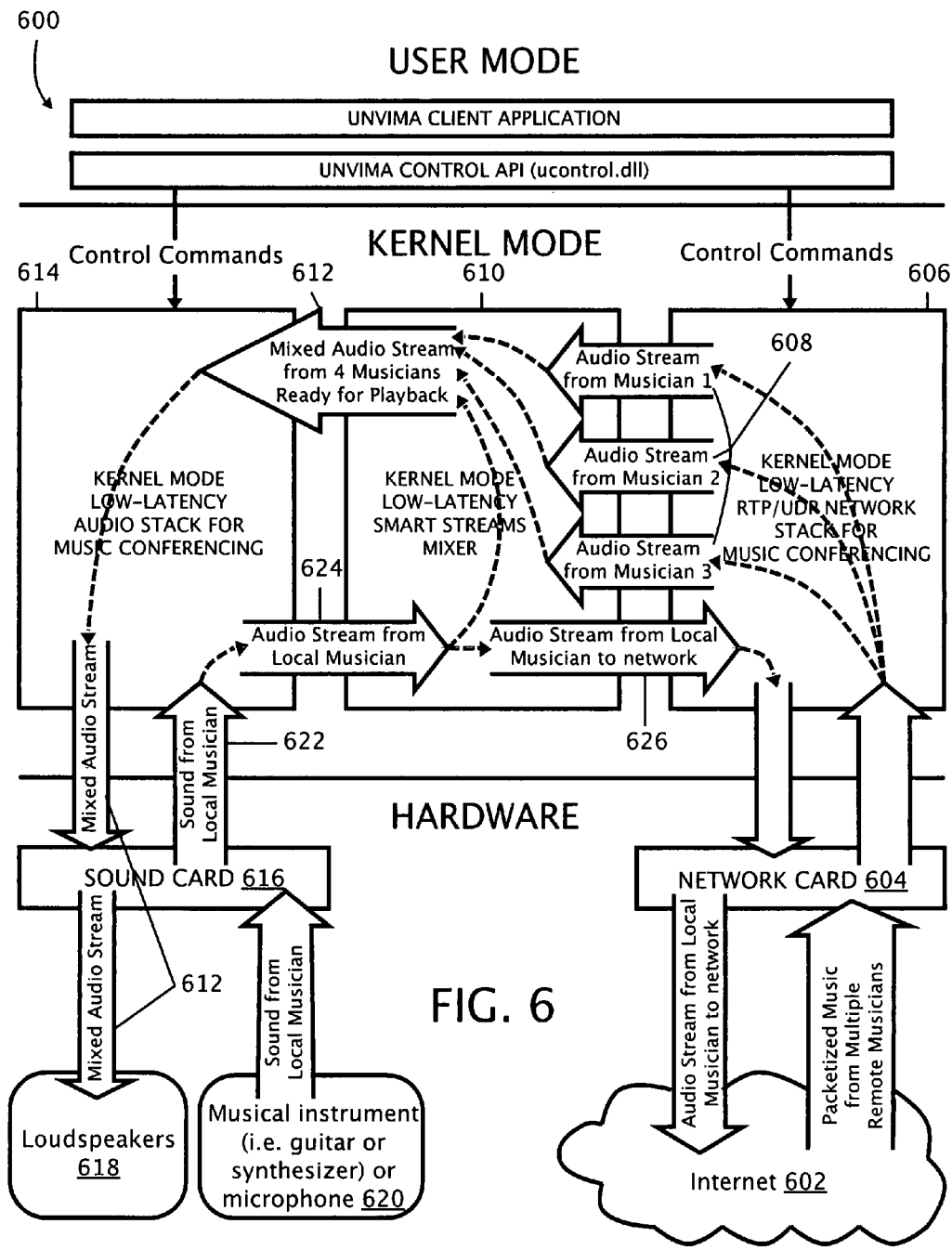
FIG. 6 is a diagram illustrating Audio Conferencing Stack Architecture according to one embodiment of the invention.

FIG. 6 is a diagram illustrating Audio Conferencing Stack Architecture 600 according to one embodiment of the invention. In FIG. 6, by way of example and not limitation, packetized audio from multiple remote participants through the Internet 602 is transmitted to a network card 604. The packetized audio enters Kernel-Mode low latency RTP/UDP network stack for audio conferencing 606. Audio streams from participants 1, 2, 3, and 4 608 enter Kernel-Mode low latency smart streams mixer 610 and resulting mixed audio streams 612 are ready for playback. The stream mixer 610, after having pulled the packets with timestamps, performs re-sampling, if necessary, volume tuning for each participant, and mixing of audio data. The stream mixer 610 performs synchronization within the Audio Stack 500, provides timestamps solution, and allows for adjustments of different sound streams with different sampling rate and different sound signal. The mixed audio streams 612 enter Kernel-Mode low latency audio stack for audio conferencing 614. The mixed audio streams coming out of the audio stack 614 can be played back, through a sound card 616, over speakers 618. Sounds from local participants 622 playing musical instruments such as guitar or synthesizer 620 are transmitted, through a sound card 616, to Kernel-Mode low latency audio stack for audio conferencing 614. Audio streams from local participants 624 processed by Kernel-Mode low latency audio stack for audio conferencing 614 are transmitted to Kernel-Mode low latency RTP/UDP network stack for audio conferencing 606. Resulting audio streams enter the network card 604 to the Internet 602 for playback and more options.

Figure 7:
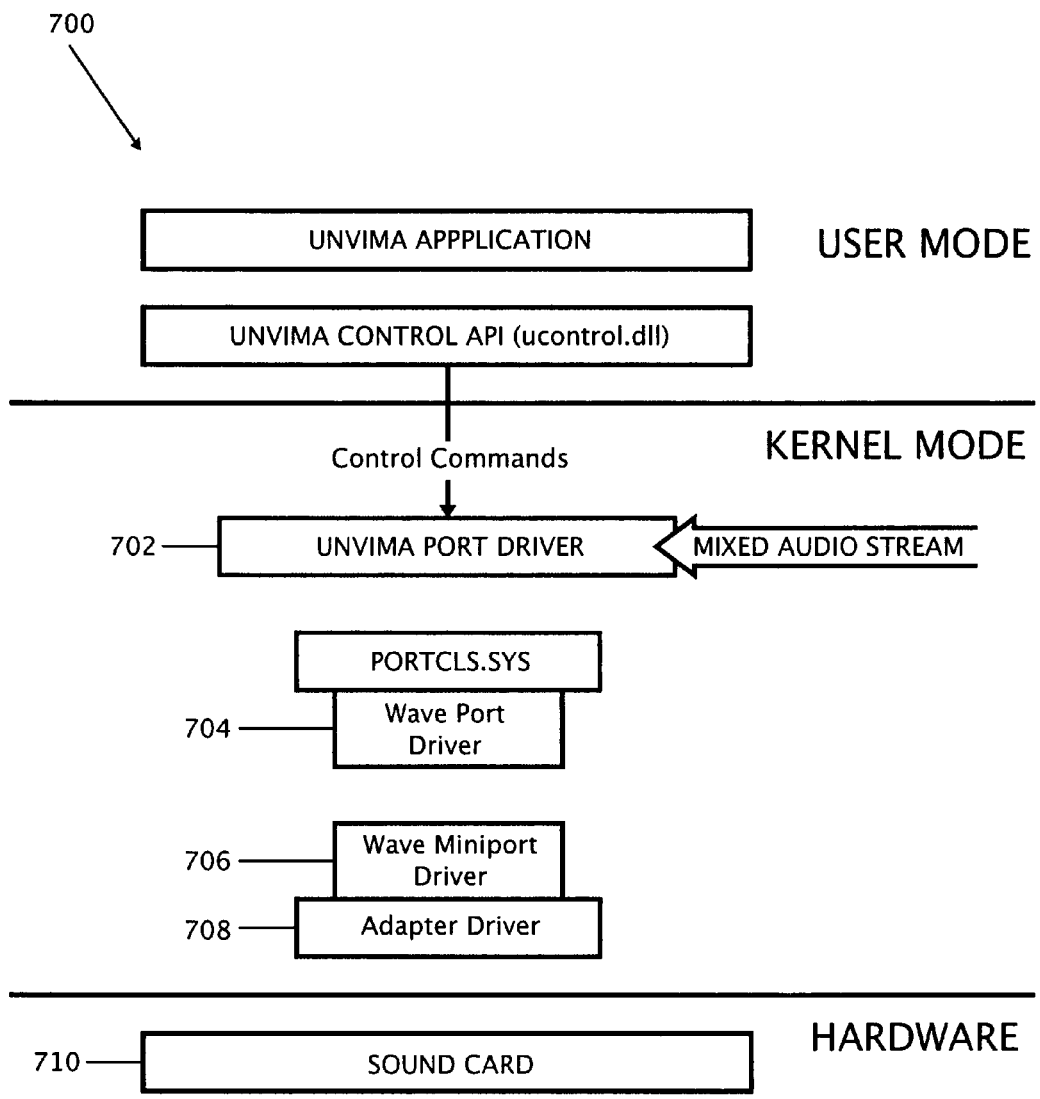
FIG. 7 is a simplified diagram illustrating Audio Stack Architecture according to one embodiment of the invention.

FIG. 7 is a simplified diagram illustrating Audio Stack Architecture according to one embodiment of the invention.

In FIG. 7, by way of example and not limitation, an Audio Stack 700 is disclosed. The Audio Stack 700 significantly reduces audio latency on a client PC running MS Windows® XP operating system. There are largely three classes of delays or latencies associated with audio transmission: hardware delays from audio card; computational delays from audio codecs due to sound processing algorithms; and delays from I/O management between user mode and kernel mode. Hardware delays stem from sound buffering that is an inherent characteristic of an audio card. Typical buffering causes latency in the range of 1 to 1.5 ms. Computational delays come from audio codecs due to sound processing algorithms. I/O management delays result from switching between User Mode and Kernel Mode. Accordingly, audio conferencing under 50 ms latency would be impossible with standard Windows® audio mechanisms even though network latency is 0 ms: two standard Windows® audio mechanisms are MME (multimedia extensions) and DirectSound. Typical MME latency can reach in the range of 300 to 1000 ms while latency introduced by DirectSound ranges from 60 to 120 ms. Such level of latency is unacceptably high either for professional audio applications or for audio conferencing. Using such standard Windows® audio stack and APIs can also lead to random delay spikes every few seconds or brief periods of distortions due to conflicts for resources, especially during high CPU load, and scheduling problems. Support for Windows Driver Model (WDM) in the audio is required, which is a mainstream technology nowadays.

The invention implements a custom audio stack 700 comprising a port driver 702, an audio port driver 704 which combines the simplicity of Windows® WaveCyclic port driver with the performance of Windows® WavePci port driver, a wave miniport driver 706, an adapter driver 708, and a sound card 710. The audio port driver 704 eliminates the handling of mappings and the need for the driver to manipulate the audio data in the stream. The audio port driver 704 also avoids the performance problems of Windows® WaveCyclic port driver by providing the client with direct access to the buffer, thereby eliminating the need for data copying. Mixed audio streams are pulled from Audio Conferencing Stack Architecture 600. Notably, the Audio Stack 700 uses Direct Kernel Streaming technology which allows bypassing Windows® audio stack for direct driver communications. This approach enables to achieve audio latency in the order of 20 ms. This approach, however, has a major drawback: if there is high CPU load in the system, high audio glitches, distortions, and additional latency frequently occur. The level of CPU load is critical for a normal audio process because high CPU load causes audio thread getting less CPU time than necessary. This results in a Deferred Procedure Call, which leads to glitches and distortions. According to one embodiment, an Audio Stack allows achieving low latency in the range of 5 to 10 ms and enabling glitch-free high quality audio. More specifically, the Audio Stack 700 utilizes Direct Kernel Streaming technology which allows a client application to bypass the generic high-latency Windows® XP audio stack to access the audio wave port driver 702. The Audio Stack 700 avoids the latency introduced by standard Windows® audio mixing mechanisms (kmixer.sys) and provides for high throughput being capable of stable glitch-free operation with small sound buffers preferably in the range of 2-5 ms. The Audio Stack 700 functions and stays in Kernel Mode, thereby solving the main performance problem caused by switching between User Mode and Kernel Mode. The Audio Stack 700 also provides an Acoustic Echo Cancellation feature which can be enabled, if necessary, to address the issue of an acoustic feedback from speakers to microphone, if the latter is connected to the client PC.

Compared to Windows® standard MME and DirectSound architectures, the Audio Stack Architecture provides much improved latency problems. In Windows® Server 2003, Windows® XP, and earlier, the only available wave port drivers are WaveCyclic and WavePci. Audio devices with WaveCyclic and WavePci port drivers require constant attention from the driver to service an audio stream after it enters the run state. The WaveCyclic port driver requires that a driver thread executes at regularly scheduled intervals to perform data copying and the WavePci port driver requires the miniport driver to continually acquire and release mappings. In Windows® XP and earlier, most audio devices use WaveCyclic miniport drivers, which are easier to implement correctly than WacePci drivers. WaveCyclic drivers, however, are sub-optimal for real-time, low-latency audio applications. For instance, during playback, a WaveCyclic driver thread must copy the client's output data to the cyclic buffer so that the audio device can play the audio data. The window must be even wider to absorb unforeseen delays and accommodate timing tolerances in the software-scheduling mechanism. By requiring data copying, the WaveCyclic driver increases the stream latency by the width of the window. The WavePci port driver provides better performance than WaveCyclic, but requires miniport drivers to perform complex operations. Failure to perform these operations correctly leads to synchronization errors and other timing problems. In addition, the WavePci miniport driver must continually obtain and release mappings during the time that the stream is running. The software overhead of handling mappings is still a significant drag on performance. Some audio devices have direct memory access (DMA) controllers with idiosyncrasies that limit the kinds of data transfers that they can perform. A DMA engine may have any of the following limitations: unorthodox buffer alignment requirements; a 32-bit address range in a 64-bit system; an inability to handle a contiguous buffer of arbitrary length; and an inability to handle a sample split between two memory pages. These limitations place constraints on the size, location, and alignment of hardware buffers. To accommodate the needs of various DMA engines, both the audio port driver 702 and WaveCyclic port driver give the wave miniport driver 706 the ability to allocate its own cyclic buffer. The wave miniport driver 706 emulates standard audio stack functions. The stream mixer 610 pulls one packet per participant of the audio conferencing session marked with same timestamps indicating all the participants played simultaneously. A single mixed block of the audio data is then formed and passed onto the audio port driver 702. The audio port driver 702 emulates all the interfaces of standard port drivers and interacts with wave miniport driver 706. The audio port driver 702 passes blocks of mixed data directly to wave miniport driver 706. According to one embodiment, switching between standard audio stack and the audio stack in the present invention is correctly achieved. Moreover, all communications between the Audio Stack 500 and the Network Stack 600 is performed within Kernel Mode. Communicating within Kernel Mode in the Audio Stack Architecture according to the present invention provides benefits over User Mode as large portion of performance overheads results from context switching between Kernel Mode and User Mode and this switch leads to glitches and latency growth.

Figure 8:
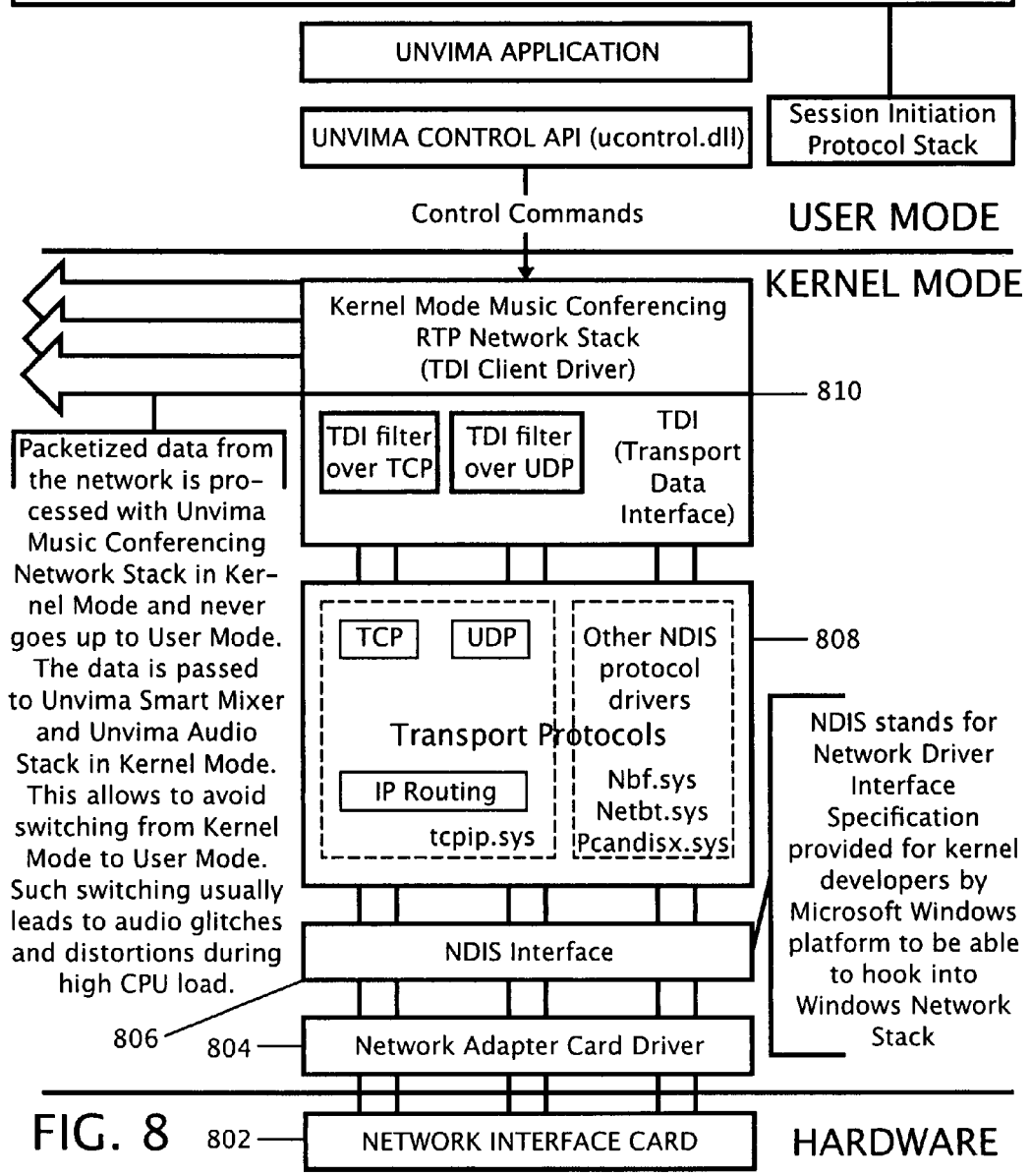
FIG. 8 is a diagram illustrating Kernel Mode Audio Conferencing Stack in Windows Network Stack according to one embodiment of the invention.

FIG. 8 is a diagram illustrating Kernel Mode Audio Conferencing Stack in Windows Network Stack 800 according to one embodiment of the invention.

Kernel Mode Audio Conferencing Stack in Windows Network Stack 800 comprises a network interface card 802, a network adapter card driver 804, an NDIS interface 806, transport protocols 808, and a TDI client driver 810. The NDIS interface 806, abbreviated for Network Drive Interface Specification and provided by Windows, enables a platform to hook into Windows network stack. The TDI client driver 810 intercepts UDP/IP network traffic, applies advanced algorithms for mitigating jilter and packet loss, and incorporates mechanisms for bandwidth adaptation mechanisms, traffic prioritization, session initiation and management. These mechanisms are fine-tuned to work in the condition of high bandwidth traffic with a strict requirement for ultra low latency. Packetized data from the network is processed with audio conferencing network stack in Kernel Mode and never goes to User Mode. The data is passed to the smart sream mixer 610 and the audio stack in Kernel Mode. This prevents switching between kernel Mode and User Mode. Such switching usually leads to audio glitches and distortions during high CPU load.

In implementing the present invention, Windows® XP operating system is employed. It is, however, possible to use other operating system such as Apple® OS X and Linux. Network requirements such as network bandwidth vary depending upon the specific needs. Bandwidth requirement for video transmission is, for instance, 500 Kbps even though video streams could be reduced to 50 to 100 Kbps, resulting in reduced bandwidth requirements. Network latency is mainly caused by network hardware delays such as by routers. According to an embodiment of the invention, the video streams bandwidth is automatically adapted to the overall bandwidth availability. Likewise, audio streams bandwidth requirement for a CD-quality sound is currently around 690 kbps yet the audio streams bandwidth is automatically adapted to the overall bandwidth availability in order to reduce these bandwidth requirements. Note that 690 kbps is uncompressed CD quality channel audio. It can be compressed without loss according to one embodiment of the present invention. Note that the present invention works with both compressed and uncompressed audio. Total of around 1.2 Mbps upstream and 3.6 Mbps downstream bandwidth for four participants are required if 500 Kbps video streams are used. This bandwidth requirement, however, could be lowered if fewer participants and/or lower resolution video are used. Bandwidth requirement is proportional to the increase and decrease of number of performers while the requirement remains constant to the number of spectators. Network latency would be around 25 ms for a good network bandwidth (DSL) and jitter is less than 5 ms. In order to overcome delays in simultaneous rendering of multiple video streams and audio glitches under heavy CPU load, high performance PCs preferably with 2 GHz or more CPU speed, 1 GB RAM, and high end audio card are desired even though lower hardware requirements can be allowed.

The problems of latency, jitter, and packet loss in an audio conferencing session over an IP network are resolved by the invention. In addressing network latency, the invention implements Real-Time Transfer Protocol (RTP) 910 and uses RTP Control Protocol (RTCP) to provide for adaptation and control. It is based on UDP over IP and provides for virtually minimum latency possible in IP networks.

Typical jitters include constant jitter, transient jitter, and short-term delay variation. Typical jitter buffers in VoIP and other applications are up to 100 ms. Typical jitter according to the present invention is in the range of 5 to 15 ms. The present invention implements an adaptive jitter buffer algorithm 928 which is designed to remove the effects of jitter from the audio stream, buffering each arriving packet for a short interval before playing it out. This replaces additional delay and packet loss for jitter. The jitter buffer algorithm 928 with parameters fine-tuned for audio conferencing scenario allows adaptation to the type of network that a participant or a client operates in.

Automatic bandwidth adaptation is necessary for smooth operation in the reality of the Internet. Even in broadband networks with multicast, there are frequent scenarios in which participants and spectators would benefit from automatic quality adaptation to bandwidth. Since there is bandwidth/latency tradeoff, it is essential to implement mechanisms for congestion control in audio conferencing technology of the invention. Multicasting makes congestion control very difficult as a sender is required to adapt transmission to suit many receivers simultaneously, a requirement that seems impossible at first glance. The advantage of multicast, however, is that it allows a sender to efficiently deliver identical data to a group of receivers, yet congestion control requires each receiver to get a media stream that is adapted to its particular network environment. The two seemingly conflicting requirements appear to be at odds with each other. The invention provides a solution to these requirements. The solution comes from layered coding, in which the sender splits its transmission across multiple multicast groups, and the receivers join only a subset of available groups. The layered coding for audio conferencing splits the data across several communication channels and manages the quantity and the properties to deliver audio stream of varying quality to different endpoints with parameters specific for audio conferencing of the present invention. The layered coding uses different parameters for different musical instruments. According to one embodiment of the present invention, voice compression optimization for musical instruments is more effectively achieved by employing layered coding mechanism. The burden of congestion control is moved from the source, which is unable to satisfy the conflicting demands of each receiver, to the receivers that can adapt to their individual circumstances.

All computer clocks are to be synchronized to a much higher level that is allowed by the currently available methods. The standard approach allowing time synchronization level between computer's clocks is insufficient and one embodiment of the present invention provides a solution to time synchronization to the level of 3 to 5 ms. The clock synchronization mechanism implemented synchronizes computers used by participants in audio conferencing very fast (approximately 15 ms) with great resolution in the range of 3-5 ms.

Figure 9:
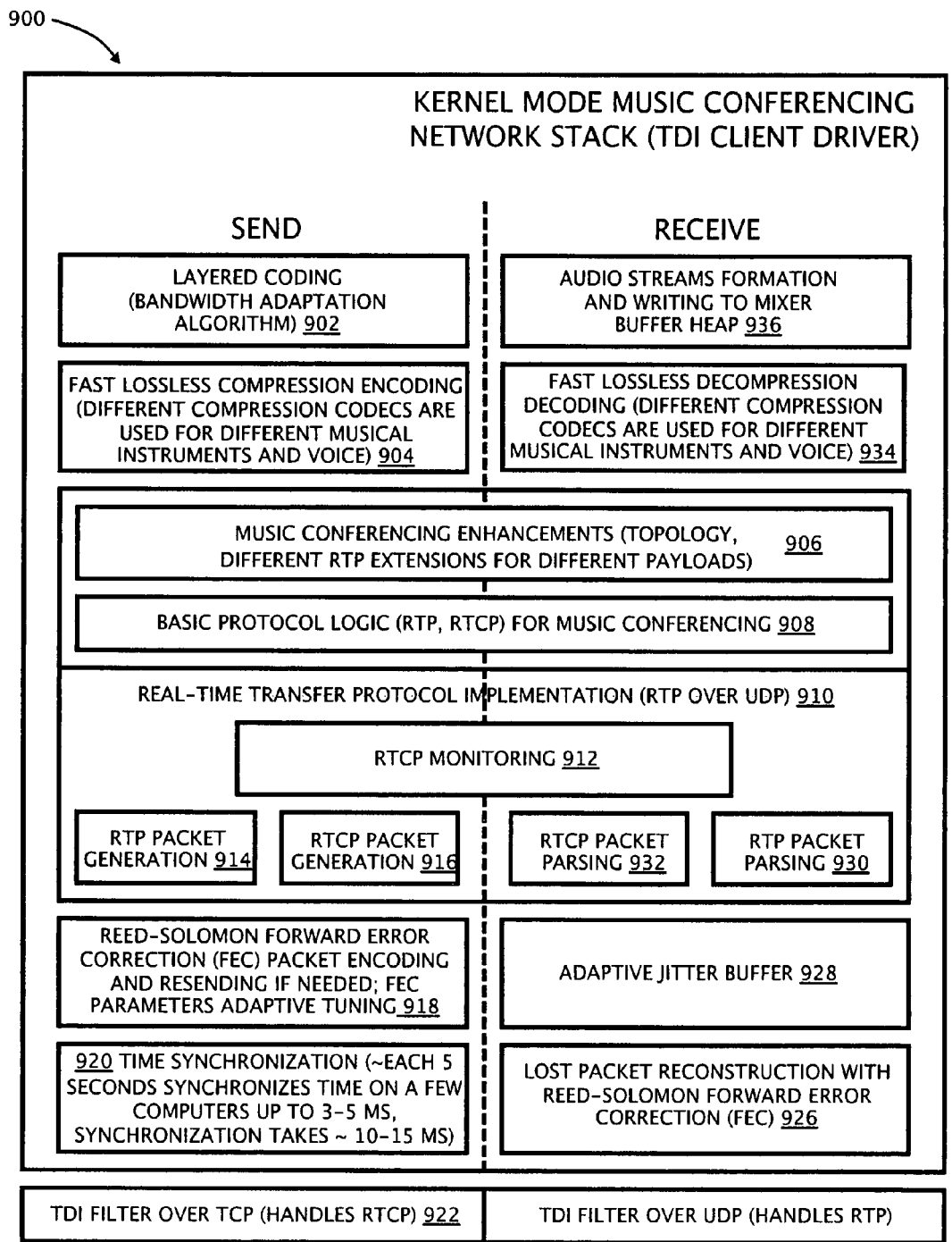
FIG. 9 is a diagram depicting Kernel Mode Audio Conferencing Network Stack as a TDI Client Driver according to one embodiment of the present invention.

FIG. 9 is a diagram depicting Kernel Mode Audio Conferencing network Stack as a TDI Client Driver according to one embodiment of the present invention.

In FIG. 9, by way of example and not limitation, Kernel Mode Audio Conferencing Network Stack as a TDI Client Driver 900 is described. The TDI Client Driver comprises a Bandwidth Adaptation Algorithm 902, a Fast Lossless Compression encoding Mechanism 904, Audio Conferencing Enhancements 906, Basic Protocol Logic for Audio Conferencing 908, Real-Time Transfer Protocol Implementation (RTP over UDP) 910, RTCP Monitoring 912, RTP Packet Generation 914, RTCP Packet Generation 916, Reed-Solon based Forward Error Correction 918, Time Synchronization 920, TDI Filter over TCP 922, TDI Filter over UDP 924, Lost Packets Reconstruction with Reed-Solomon based Forward Error Correction 926, Adaptive Jitter Buffer 928, RTP Packet Parsing 930, RTCP Packet Parsing 932, Fast Lossless Decompression Decoding 934, and Audio Streams Formation and Writing to Mixer Buffer Heap 936. Kernel Mode Audio Conferencing Network Stack as a TDI Clint Driver is not a common approach as no applications require low latency in the audio-network integrated scenario. The TDI Client Driver 810 intercepts UDP/IP network traffic, applies advanced algorithms for mitigating jitter and packet loss, and incorporates mechanisms for bandwidth adaptation mechanisms, traffic prioritization, session initiation and management. These mechanisms are fine-tuned to work in the condition of high bandwidth traffic with a strict requirement for ultra law latency.

Figure 10:
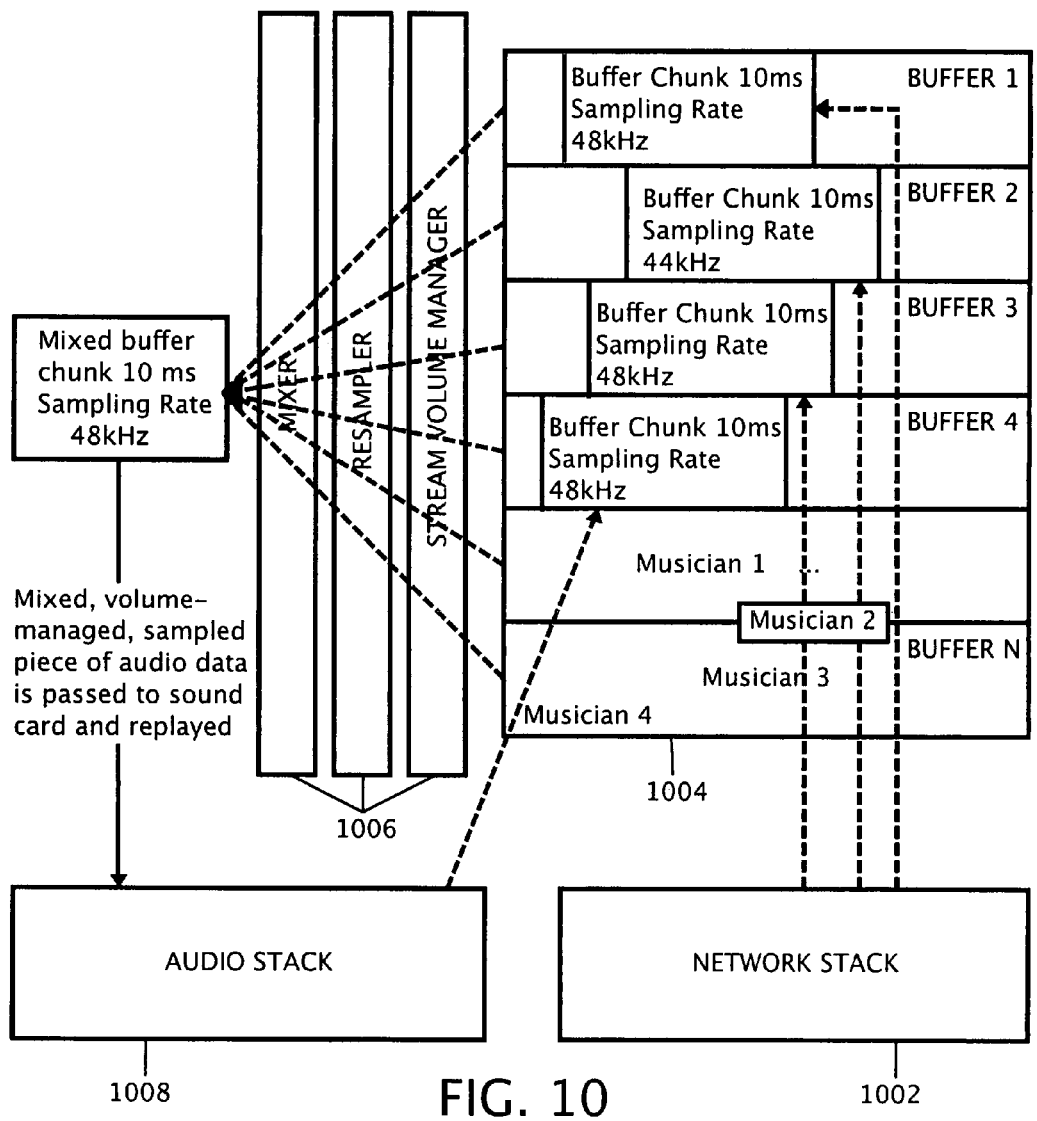
FIG. 10 is a diagram illustrating an Audio Conferencing scheme according to an embodiment of the present invention.

FIG. 10 is a diagram illustrating an Audio Conferencing scheme according to an embodiment of the present invention.

In FIG. 10, by way of example and not limitation, buffer chunks 1004 for each participant are extracted from network packets, organized in several streams by audio conferencing network stack 1002, and are placed in special buffers 1004. A Stream Mixer 1006, after having pulled the chunks with timestamps, performs re-sampling, if necessary, volume managing for each participant, and mixing of audio data. Mixed, volume managed, resampled piece of audio data is passed to a sound card and replayed via Audio Stack 1000.

Figure 11A:
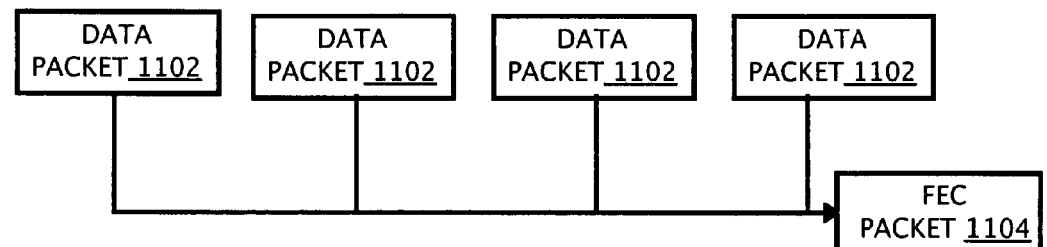
FIGS. 11A, 11B and 11C are schematic diagrams of Reed-Solomon based Forward Error Correction according to embodiments of the present invention.
Figure 11B:
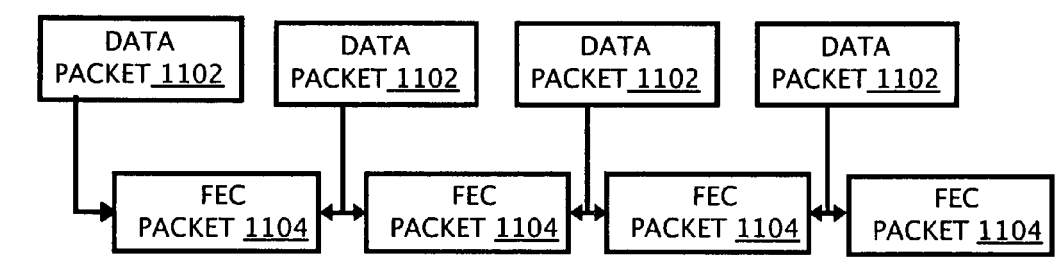
Figure 11C:
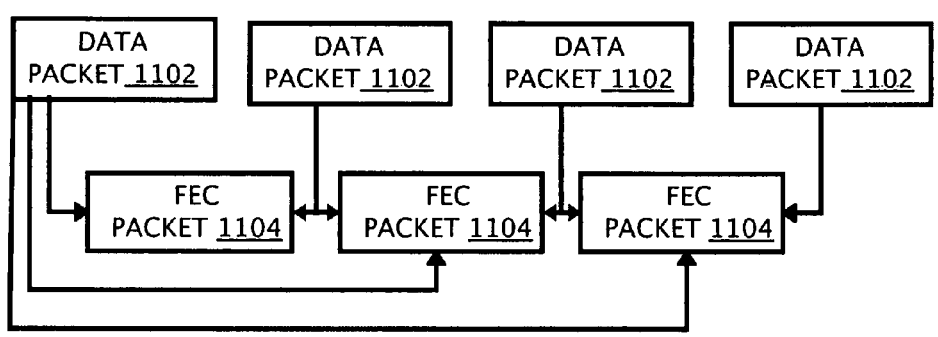

FIGS. 11A, 11B and 11C are schematic diagrams of Reed-Solomon based Forward Error Correction according to embodiments of the present invention.

In FIG. 11A, Reed-Solomon based Forward Error Correction (FEC) algorithm 1100 is described. The invention takes advantage of Fast Reed-Solomon based Forward Error Correction algorithms 1100 to address packet loss. The FEC based on Reed-Solomon codes or algorithms is implemented to manage and change Reed-Solomon algorithm parameters on the fly as needed to adapt for the present invention. The FEC 1100 transforms a bit of stream to make it robust for transmission. The original data packets 1102 are transmitted to a FEC packet 1104 to generate a larger bit stream intended for transmission across a lossy medium or network. The additional information in the transformed bit stream allows receivers to exactly reconstruct the original bit stream in the presence of transmission errors. Reed-Solomon encoding FEC algorithm involves treating each block of data as the coefficient of a polynomial equation. The equation is evaluated over all possible inputs in a certain number base, resulting in the FEC data to be transmitted. Often the procedure operates per octet, making implementation simpler. Diagrams and parameters can be implemented by those skilled in the art upon a reading of the specification and a study of the drawings included herein.

In FIG. 11B, another FEC algorithm 1106 according to one embodiment is described. Yet another embodiment of treating each block of data 1102 as the coefficient of a polynomial equation is described. The equation is evaluated over all possible inputs in certain number base, resulting in the FEC data 1104 to be transmitted. Diagrams and parameters can be implemented by those skilled in the art upon a reading of the specification and a study of the drawings included herein.

In FIG. 11C, another FEC algorithm 1108 according to one embodiment is described. Diagrams and parameters can be implemented by those skilled in the art upon a reading of the specification and a study of the drawings included herein.

Figure 12:
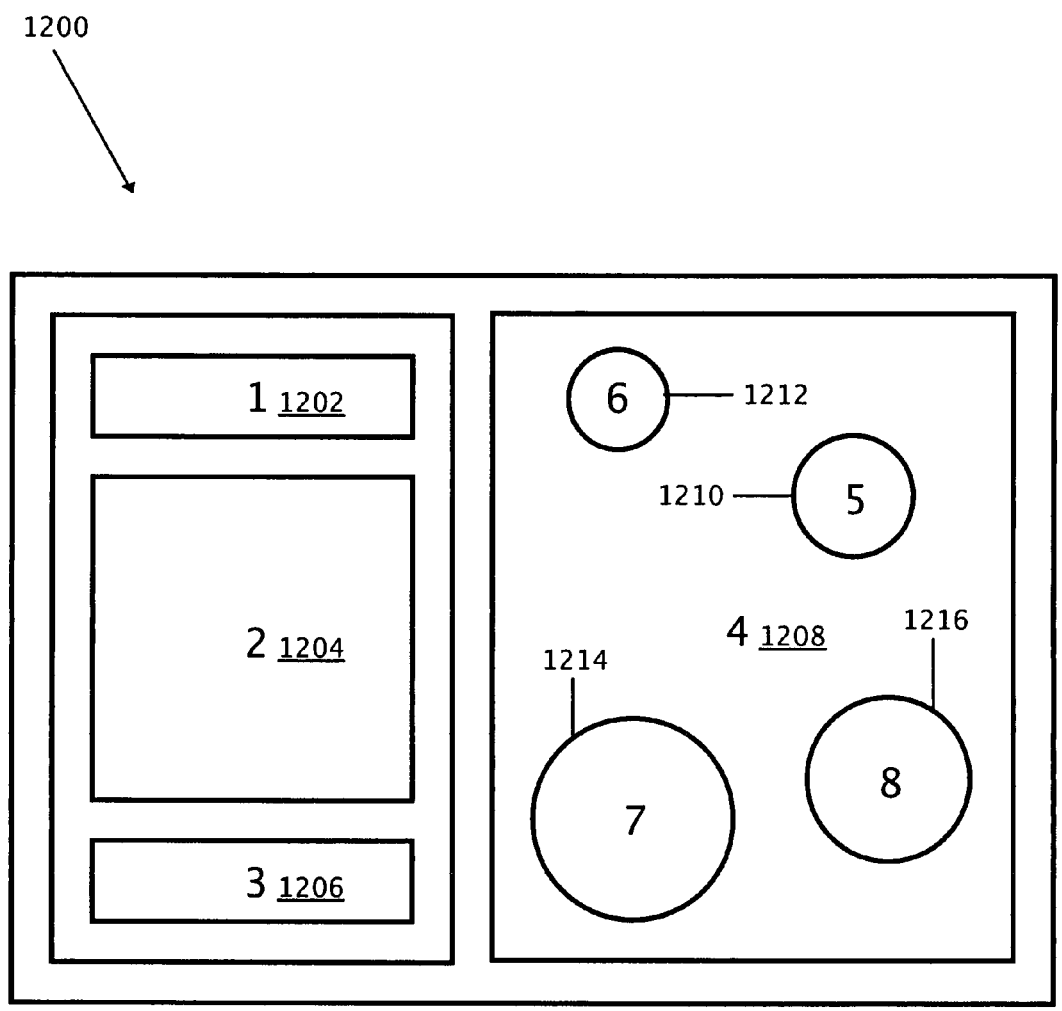
FIG. 12 depicts a three-dimensional online community browser according to one embodiment of the invention.

FIG. 12 depicts a three-dimensional online community browser according to one embodiment of the present invention.

In FIG. 12, a three-dimensional online community browser according to one embodiment is described.

The three-dimensional community browser 1200, by way of example and not limitation, provides choice buttons for participants in the community. Search Box 1202, Search Settings Pane 1204, and Mode Switch Pane 1206 are described. Users are displayed as three-dimensional shapes/avatars 1210, 1212, 1214, and 1216 in a three-dimensional space 1208. Search Box 1202 contains a textbox to enter a string and search button. When a user presses search button the three-dimensional world of the music community users is generated. Only those users who satisfy search criteria are displayed. Search criteria are specified by a number of search settings set in area. Navigation tools are provided which enable users in search mode to fly in the three dimensional space. As users fly closer to a three-dimensional shape of community, users start hearing an audio sample from their profile. The three-dimensional sound changes as users fly in the three dimensional representation of the music community using head-related three dimensional sound generation functions. Showing them as three-dimensional shapes of bigger size and different color schemes will highlight users with profiles that match the string entered in the search box. When you click on the user's avatar you are redirected to his profile where you can see the detailed information about the user and remember him by adding his profile to Remembered People List 1318. Search Settings Pane 1204 consists of four animated circular menus that allow refining the search by setting some parameters important for participants. The parameters, by way of example and not limitation, are: instrument, style, and skill. These three menus provide predefined choice that let filter users by the parameters. The fourth menu that goes on top provides "Group by" functionality. Users choose among several parameters to a group by such as age, distance, artist, instrument, skill, style and so on and the generated world will display users clustered in the three dimensional world according to this profile setting. This feature allows for a simple navigation if the number of users is very large. Mode Switch Pane 1206 switches the three-dimensional space 1204. In the community browser mode the view pane displays the three-dimensional world of the music community members. In other modes other functionality is available in the three-dimensional space 1204. Modes are switched in mode Switch Pane 1206. The modes include community, people, bands, profile and others.

Figure 13:
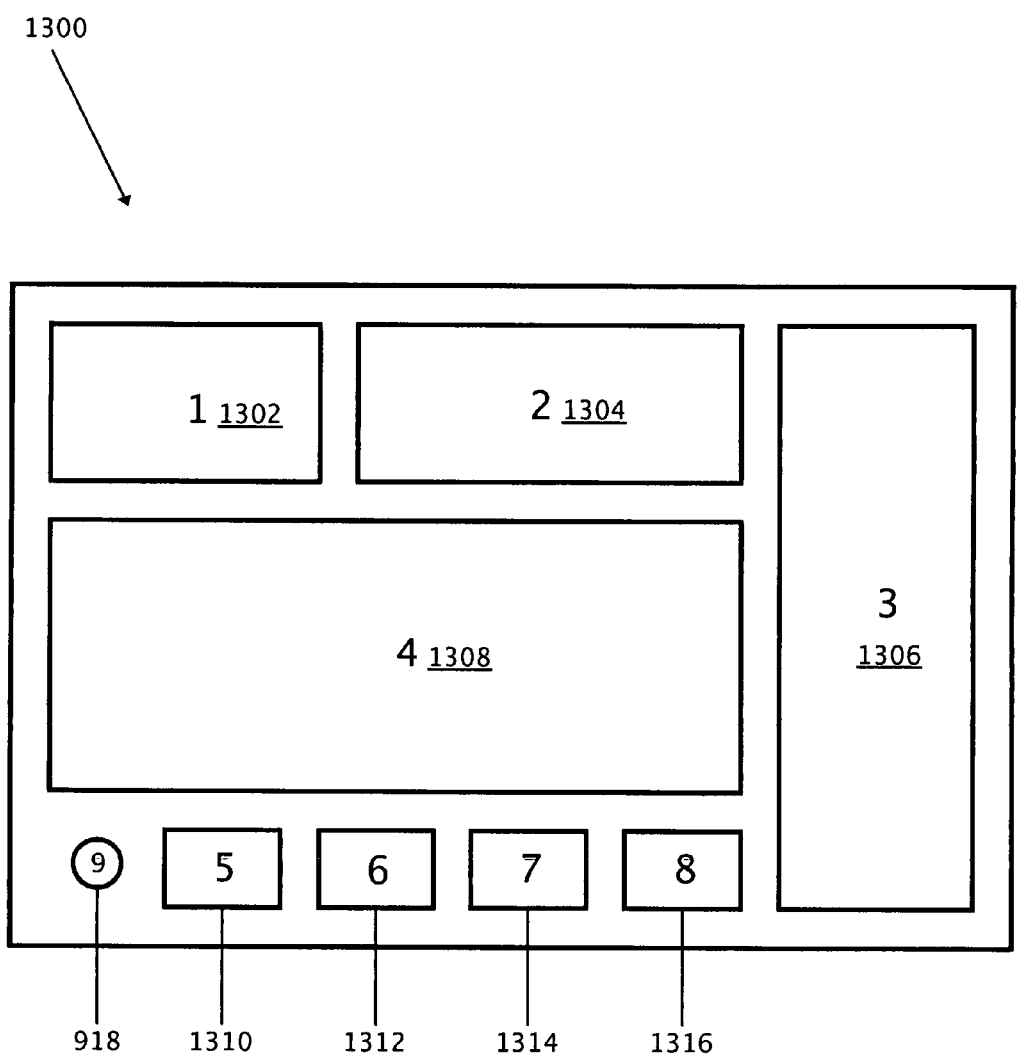
FIG. 13 depicts a participant's profile according to an embodiment of the invention.

FIG. 13 depicts a participant's profile according to one embodiment of the present invention.

A participant creates his/her own profile 1300 to share with other participants in the online community. The participant's profile 1300 includes, by way of sample and not limitation, user photo or avatar 1302, user name with a list of styles and skill level 1304, a list of audio samples recorded or uploaded by a user 1306, a map showing geographic location of the user and friends or band mates, slots for graphical images of the musical instrument the user plays/owns 1310, 1312, 1314, and 1316, and a remember button 1308. A random sample is played in the three-dimensional community browser when a visitor comes close to the participant. Audio samples in the list 1306 can be various formats. Graphical images in the slots 1310, 1312, 1314, and 1316 can be preselected from the library of images or uploaded by a user. When a visitor presses a remember button 1318 the user whose profile is being displayed is added to the list of remembered people. Afterwards users can invite the remembered people to a virtual band formed by participants.

Figure 14:
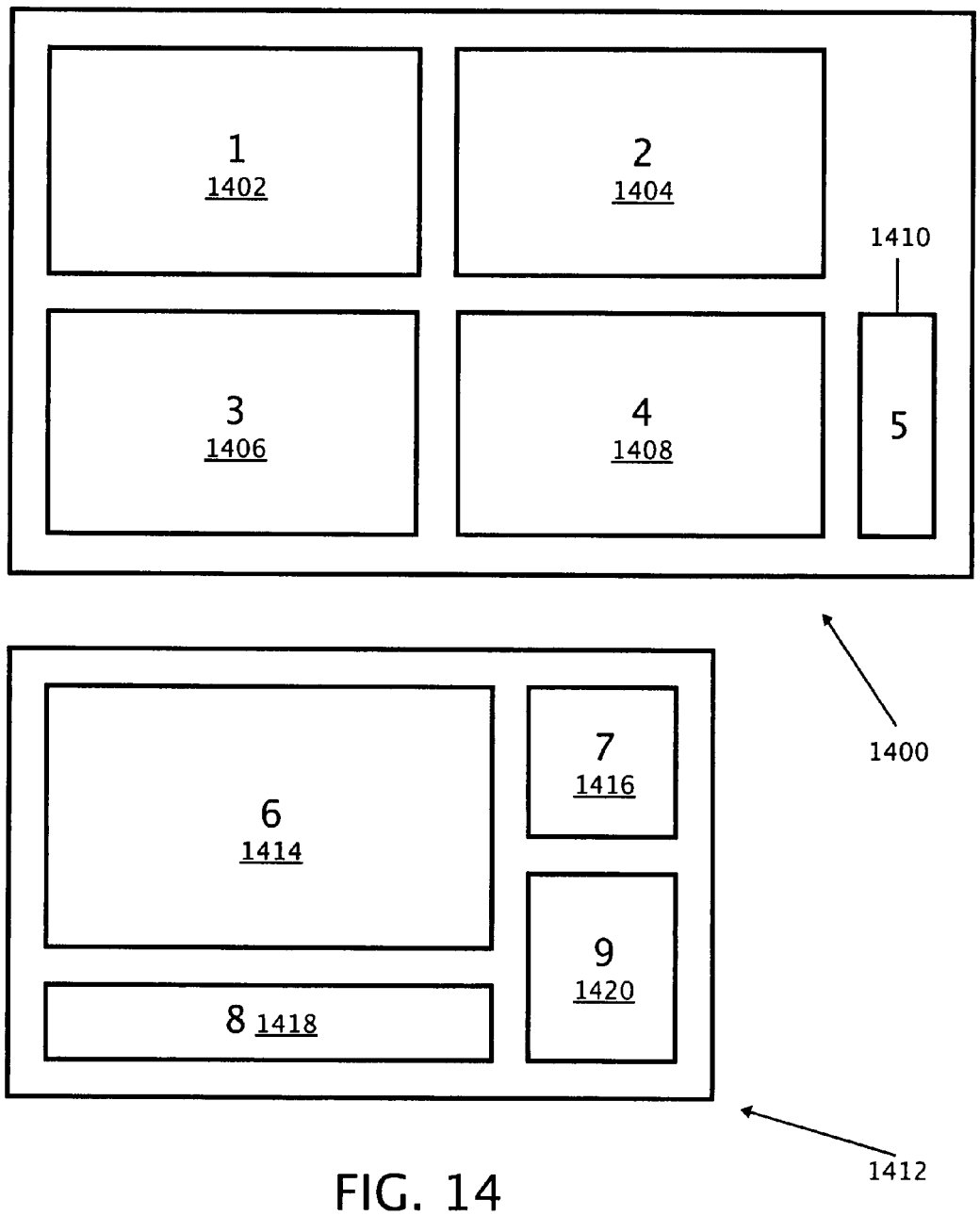
FIG. 14 depicts a joint session among the participants according to an embodiment of the invention.

FIG. 14 illustrates a joint session among the participants according to one embodiment of the present invention.

The live concert view 1400 consists of several participant windows 1402, 1404, 1406, and 1408 in which the video pictures of the participants are shown. Video or web cameras capture the video pictures. A participant window contains several controls and is on a separate diagram 1412. A control pane 1410 provides the following link buttons: join live concert, leave lice concert, record live concert, change instrument, change window layout, invite a participant, invite a spectator, invite a DJ/Mixer, apply effects, tune audio settings, set audio stream quality, set video stream quality, and set recording options. The participant window 1412 consists of a video picture 1414 which shows a video stream from one participant, an image 1416 which displays the participant's musical instrument, a volume control 1420 integrated with control buttons which allow switching between the actual video and the computer generated avatar or visualization, a button which allows applying sound effects to the given participant's audio stream, buttons which allow turning off or mute the participant. If the turn off button is pressed on the user's own picture the user quits the audio conferencing session. A graphic equalizer 1418 visualizes the audio stream being replayed. After getting feedback from the audience and peer participants on the audio samples, the newly formed band refines their music style and skills and shares real-time live performance to the audience. Number of participants participating in the jam session varies depending upon broadband bandwidth while currently up to four groups of performers can be joined in the jam session. However, virtual Internet concerts can be scaled to thousands of simultaneous spectators.

Figure 15:
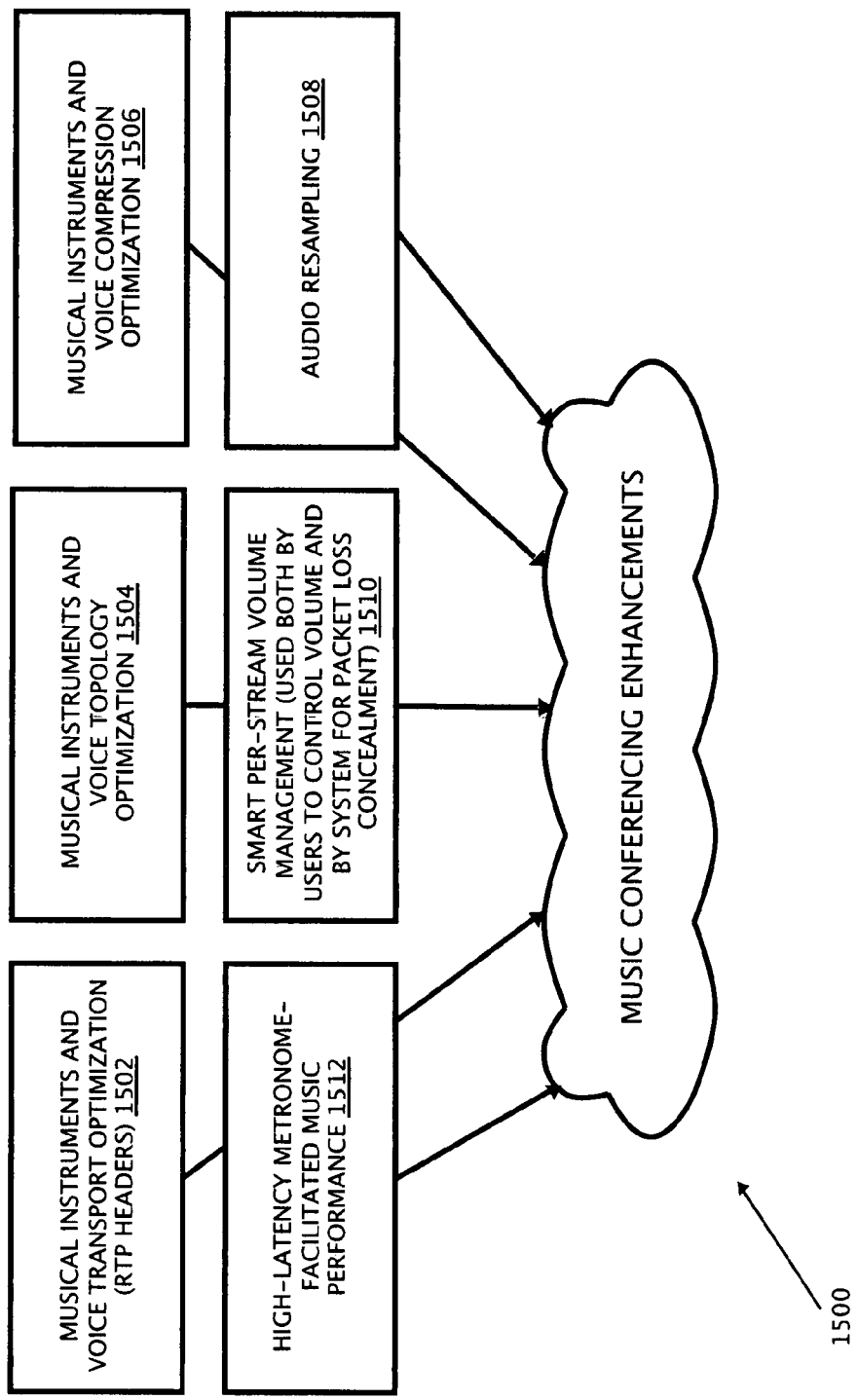
FIG. 15 depicts audio conferencing enhancements.

FIG. 15 depicts audio conferencing enhancements according to the present invention.

Audio Conferencing Enhancements 1500 include Musical Instruments Transport Optimization 1502 which allows to send voice and various audio enhancements with different requirements for rhythm with specific RTP extensions and with specific network paths, Musical Instruments Topology Optimization 1504 which deals with different rhythm requirements for participants playing different musical instruments, Musical Instruments and Voice Compression Optimization 1506, Audio Sampling 1508, Smart Per Stream Metronome Facilitated High Latency Audio Performance 1506 which allows performance with higher latency than 50 ms, and Smart Volume Management for Packet Loss Concealment 1508.

It will be appreciated to those skilled in the art that the preceding examples and preferred embodiments are exemplary and not limiting to the scope of the present invention. The invention is not limited to audio conferencing and is applied to any applications requiring audio data with high quality and low latency. It is intended that all permutations, enhancements, equivalents, and improvements thereto that are apparent to those skilled in the art upon a reading of the specification and a study of the drawings are included within the true spirit and scope of the present invention.

What is claimed is:

1. An audio conferencing system comprising:
   a plug-in hardware device coupled with a client computer;
   a sound card coupled with the client computer; and
   a modified Windows operating system running on the client computer including:
      a custom network stack comprising real-time transfer protocol, an adaptive jitter buffer algorithm, a packet loss prevention algorithm, a bandwidth adaptation mechanism utilizing layered coding mechanism, time synchronization with network time protocol and stream synchronization and mixing algorithms;
      a custom audio stack comprising a port driver, an audio port driver configured to eliminate the handling of mappings and the need to manipulate audio data in one or more audio streams, a wave miniport driver, a stream mixer, and an adapter driver; and
      one or more audio conferencing enhancements.

2. The system of claim 1 wherein said hardware device includes a musical instrument.

3. The system of claim 1 wherein both the custom network stack and the custom audio stack process audio data received over a network in kernel-mode only and never go into user-mode to avoid I/O delays resulting from switching between user-mode and kernel-mode which leads to audio glitches and distortions during high CPU load.

4. The system of claim 3 wherein said audio conferencing enhancements provide musical instruments and voice compression optimization where different compression codecs are used for different musical instruments and voices.

5. The system of claim 3 wherein said audio conferencing enhancements provide musical instruments and voice decompression optimization where different decompression codecs are used for different musical instruments and voices.

6. The system of claim 3 wherein said network stack comprises a real-time transfer protocol with custom extensions for voice and various musical instruments.

7. The system of claim 3 wherein said network stack comprises an adaptive jitter buffer algorithm designed to remove uttering effects from an audio stream.

8. The system of claim 3 wherein said network stack comprises a Reed-Solomon based Forward Error Correction algorithm designed to prevent packet loss.

9. The system of claim 3 wherein said network stack comprises a bandwidth adaptation with layered coding mechanism.

10. The system of claim 3 wherein said network stack comprises time synchronization with network time protocol.

11. The system of claim 3 wherein network latency is no more than 50 ms.

12. The system of claim 3 wherein said stream mixer of the custom audio stack utilizes direct kernel streaming technology which allows by passing a generic high-latency audio stack of the Windows operating system for direct drive or communications.

13. The system of claim 3 wherein said audio conferencing enhancements provide voice and rhythm transport optimization.

14. The system of claim 3 wherein said audio conferencing enhancements provide conference topology optimization.

15. The system of claim 3 wherein said audio conferencing enhancements provide musical instruments and voice compression optimization.

16. The system of claim 3 wherein said audio conferencing enhancements provide metronome facilitated high latency audio performance.

17. The system of claim 3 wherein said audio conferencing enhancements provide smart volume management for packet loss concealment.

* * * * *